(12) United States Patent
Schlanger

(10) Patent No.: US 7,186,030 B2
(45) Date of Patent: Mar. 6, 2007

(54) EXPANDABLE SHAFT ASSEMBLY

(76) Inventor: Raphael Schlanger, 128 Hulda Hill Rd., Wilton, CT (US) 06897

( * ) Notice: Subject to any disclaimer, the term of this patent is extended or adjusted under 35 U.S.C. 154(b) by 144 days.

(21) Appl. No.: 10/909,138

(22) Filed: Jul. 30, 2004

(65) Prior Publication Data

US 2005/0052072 A1 Mar. 10, 2005

Related U.S. Application Data

(60) Provisional application No. 60/492,355, filed on Aug. 4, 2003.

(51) Int. Cl.
*F16B 7/18* (2006.01)
*F16B 13/06* (2006.01)

(52) U.S. Cl. ............... 384/545; 384/538; 384/540; 403/343; 411/16

(58) Field of Classification Search ........... 384/545, 384/540, 538; 411/16–18; 403/342, 343
See application file for complete search history.

(56) References Cited

U.S. PATENT DOCUMENTS 4,531,847 A * 7/1985 F'Geppert ............. 384/538
6,074,119 A * 6/2000 Schlanger ............. 403/343
6,533,301 B1 * 3/2003 Catania ............. 403/367

* cited by examiner

*Primary Examiner*—Thomas R. Hannon

(57) ABSTRACT

An expandable shaft assembly including an axially extending shaft with an axial axis, an extending shaft with an axial axis, an external dimension, at least one shaft end and a bore extending generally axially from the at least one shaft end. The shaft assembly also includes a second element, as an axle cap, with an axially extending, externally threaded portion with a first thread flank, a shoulder portion extending in a generally radially outwardly direction. A radially extending end face is also provided that is axially constrained relative to the shaft, wherein the radially extending end face is one of (1) integral with the shaft, and (2) on a separate element. The bore of the shaft includes an axially extending, internally threaded portion with a second thread flank, wherein at least one of the first and second thread flanks are inclined. The externally threaded portion of the second element is threadably engaged with the internally threaded portion of the shaft such that the first thread flank contacts the second thread flank. In addition, the shoulder portion of the second element is pressed against the end face and the inclined thread flank is wedged against at least one of the first thread flank and second thread flank to provide radial expansion of the external dimension in an expansion region.

41 Claims, 11 Drawing Sheets

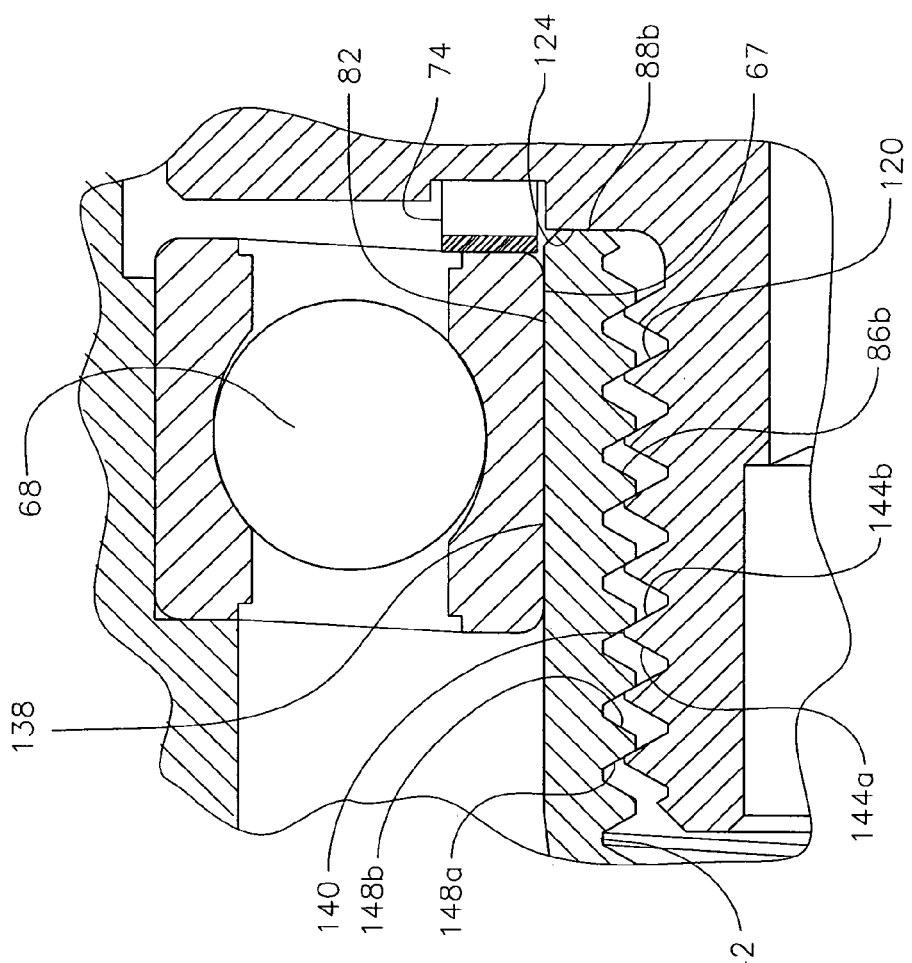
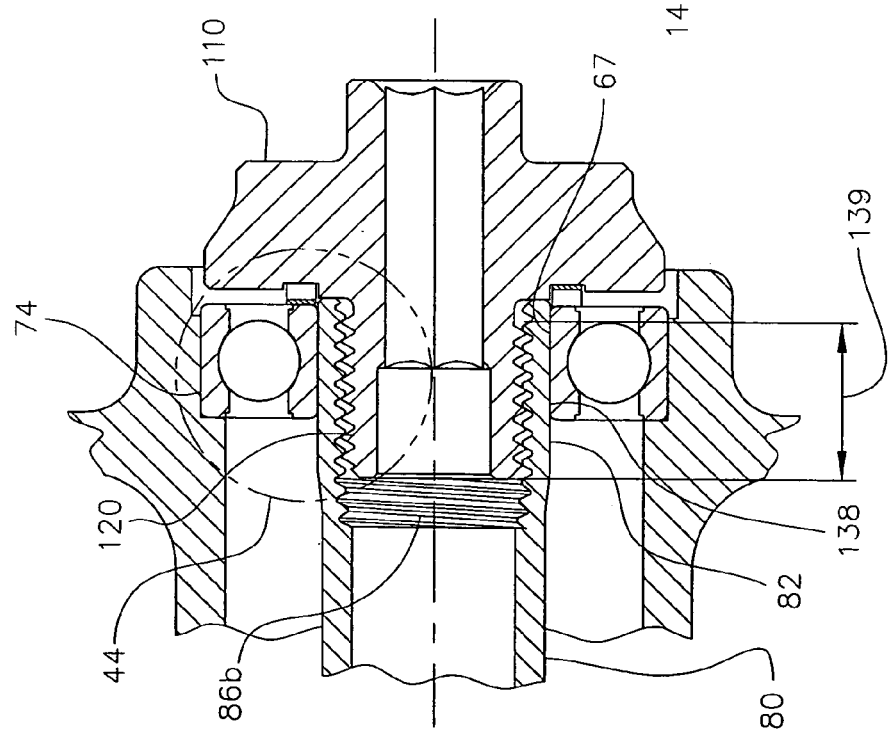
FIG. 1h
FIG. 1g

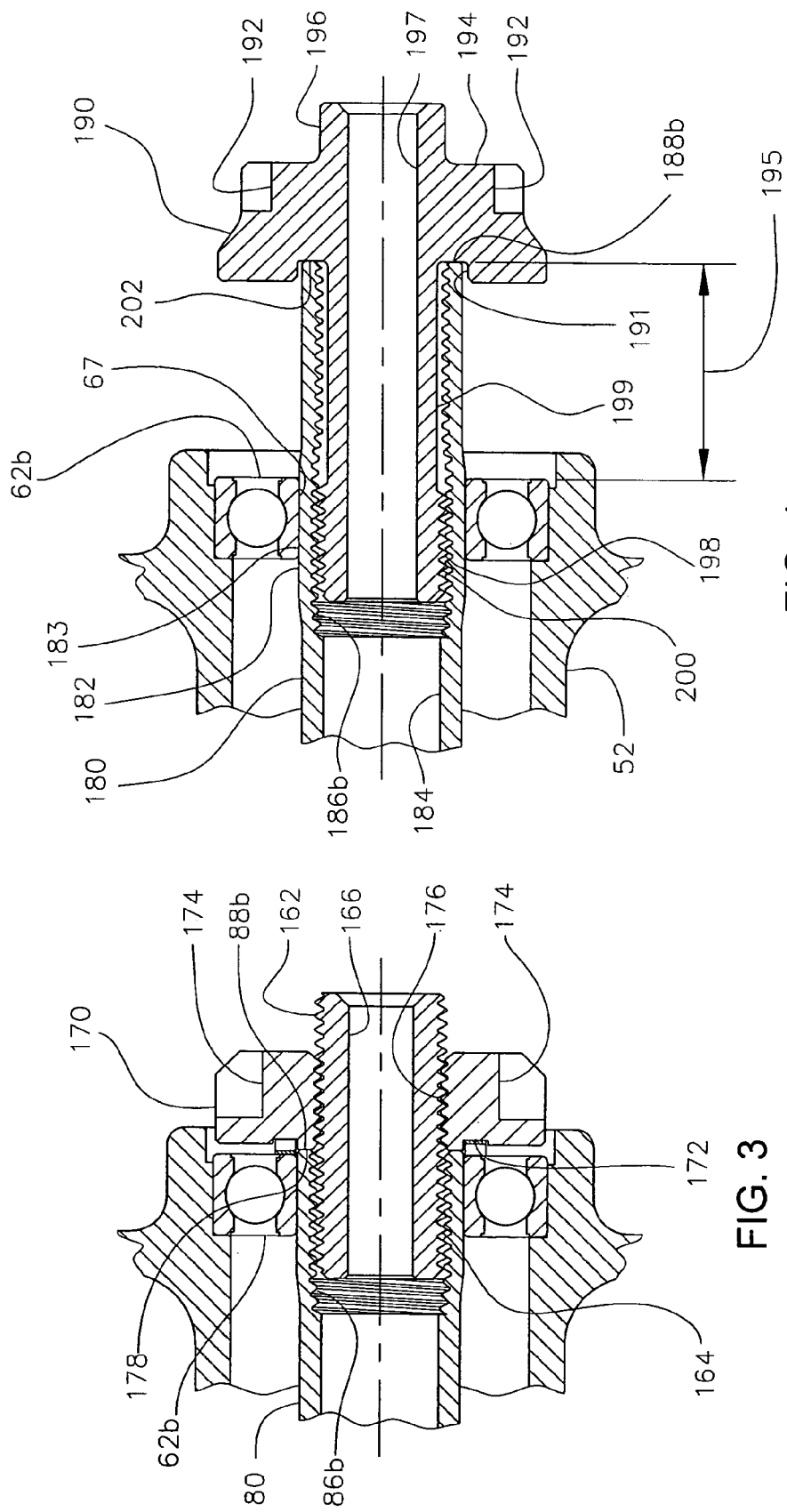

EXPANDABLE SHAFT ASSEMBLY

CROSS-REFERENCE TO RELATED APPLICATION

This application claims priority of U.S. provisional patent application 60/492,355, filed Aug. 4, 2003, and entitled "Expandable Shaft Assembly".

BACKGROUND OF THE INVENTION (1) Field of the Invention

The present invention relates to an expandable shaft with an expandable external dimension to adjust the fit between the shaft and an element surrounding the shaft. The present invention is particularly useful in the context of a bicycle hub.

(2) Description of the Related Art

The current state of the art in bicycle hub construction utilizes two conventional deep-groove radial cartridge bearing assemblies. This type of bearing is very sensitive to axial misalignment between the outer race and the inner race. Any misalignment will cause premature wear and a rough rotating action of the bearing assembly.

The current state of the art hub shell commonly includes a hub shell, two bearing assemblies, an axle with a pair of axle caps at its ends. The axle commonly includes a pair of axially spaced shoulders to axially locate and separate the inner race of these two bearing assemblies. Due to the inevitable tolerances inherent in the manufacture of the axle and hub shell components, the axial spacing of the axle shoulders are rarely, if ever, are perfectly matched to the axial spacing of the hub shell shoulders. This means that the bearing assemblies cannot be made to perform optimally on a consistent and reliable basis.

With this conventional arrangement, the axle, which is usually turned on a lathe is a relatively expensive component to fabricate: firstly because the starting stock diameter needs to be oversized to accommodate the outside diameter of the shoulders, secondly because of the machining time to remove this excess stock in the non-shoulder areas, thirdly due to the accurate axial spacing of the shoulders required in the attempt to minimize any misalignment of the bearings, and fourthly because the diameter of the axle must be very accurately controlled in the attempt to create a controlled fit between the outside diameter of the axle and the inside diameter of the bearing.

The fit of the outside diameter of the axle and the inside diameter of the mating bearing assembly must be very closely controlled such that sufficient clearance exists to permit assembly without applying excessive axial load on the bearing, while at the same time reducing this clearance in an attempt to minimize any looseness or free-play between the two. The optimum fit is very difficult, if not impossible to achieve and usually results in some degree of free-play in the system.

Although some attempts have been made to employ a spring washer into this conventional hub design to create a preload to the bearing assembly, this has only been partially successful. Firstly, in order to permit the preload spring washer to apply a preload, there needs to be sufficient clearance between the axle and the bearing to allow the inner race to be axially displaced by the spring washer. This clearance obviously adds to the undesirable free-play of the system. Secondly, since the spring washer is a yieldable element, the inner race of the bearing may now shift relative to the axle, any axial loads applied to the rim of the wheel will tend to compress this spring washer and allow the hub shell to axially shift relative to the axle. This can impart a wobbly or flexy feel to the wheel, resulting in a diminished feeling of control on the part of the rider.

SUMMARY OF THE INVENTION

It is an object of the present invention to overcome the forgoing disadvantages and to create an economical hub assembly that will reduce or eliminate binding in the bearing assembly(s) due to axial misalignment of the bearing races.

In accordance with the present invention, it has now been found that the forgoing objects and advantages may be readily obtained.

In accordance with the present invention, the axle is expanded to contact and lock with the inside diameter of the bearing without forcing an axial displacement of the inner race, the bearing is able to run more smoothly with reduced friction and with longer life. Furthermore, if a spring washer or some other means to apply a controlled axial preload to the inner race of the bearing is employed, the bearing's rolling action may be even further optimized, since the axle locks the bearing race in the precise axial location dictated by the spring washer. Yet further, since the expansion of the axle may be utilized to axially lock the inner race of the bearing to the axle, any axial loads applied to the hub shell will not have the unwanted effect of compressing the spring washer and axially displacing the hub shell relative to the axle.

Furthermore, in accordance with the present invention, since the axle does not necessarily need to utilize shoulders in its outside diameter, the axle may instead have a straight cylindrical outside diameter. This saves material and fabrication cost related to accurately to the located shoulders and to the excess material that would otherwise need to be removed from the starting stock to create these shoulders. Yet further, the lack of shoulders permits the outside diameter of the axle to be machined by a centerless grinding process, a very accurate and cost-effective fabrication procedure. Furthermore, since the outside diameter of the axle is controlled by expansion and not necessarily by a precise machined tolerance, the axle may not require such precise diameter tolerances, thereby further reducing fabrication cost.

Still further, in accordance with the present invention, since the axle is expanded to contact the inside diameter of the bearing, a degree of assembly clearance may be incorporated into the design to permit easy assembly. After assembly and subsequent expansion, this assembly clearance is reduced or eliminated to create an optimized fit between the outside diameter of the axle and the inside diameter of the bearing assembly. Furthermore, this clearance insures that there is no assembly friction between the bearing and the axle that may cause unwanted axial displacement between the inner and outer races of the bearing assembly that may cause binding of its rolling elements.

The present invention comprises: An expandable shaft assembly, comprising: an axially extending shaft, including an axial axis, an external dimension, at least one shaft end, and a bore extending generally axially from said at least one shaft end; a second element, including an axially extending, externally threaded portion with a first thread flank, a shoulder portion extending in a generally radially outwardly direction; a radially extending end face that is axially constrained relative to said shaft wherein said radially extending end face is one of (1) integral with said shaft, and (2) on a separate element; wherein said bore of said axially extending shaft includes an axially extending, internally threaded portion with a second thread flank, at least one of said first thread flank and said second thread flank is an inclined thread flank, said externally threaded portion of said second element is threadably engaged with said internally threaded portion of said shaft such that said first thread flank contacts said second thread flank, and said shoulder portion of said second element is pressed against said end face and said inclined thread flank is wedged against at least one of said first thread flank and said second thread flank to provide radial expansion of said external dimension in an expansion region.

BRIEF DESCRIPTION OF THE DRAWINGS

The present invention will be more readily understandable from a consideration of the accompanying exemplificative drawings, wherein:

FIG. 1b is an exploded view in axial cross section, describing the components of FIG. 1a.

FIG. 1c is a partially exploded view in axial cross section, describing the partially assembled components of FIG. 1a.

FIG. 1d is an axial cross section view, describing the loosely assembled components of FIG. 1a.

FIG. 1g is a detailed view corresponding to FIG. 1e, showing the preload axle cap threadably tightened against the axle, including radial expansion of the axle.

FIG. 1h is an enlarged detail view corresponding to region 44 of FIG. 1g, detailing the threaded assembly between the preload axle cap and the axle, including radial expansion of the axle.

FIG. 3 is an enlarged detail axial cross section view, detailing the threaded assembly between the preload axle cap and the axle, including a compression nut.

FIG. 4 is an enlarged detail axial cross section view, detailing the threaded assembly between the axle cap and the axle, including a radially bulged axle portion.

DETAILED DESCRIPTION OF THE INVENTION

The present invention does not necessarily rely on an axial shoulder to axially fix the inner race of the bearing assembly. Instead, the bearing assembles are first located in the optimal axial position, then the axle is expanded radially to grip the inner race of the bearing assembly. The inner race of the bearing assembly is thereby locked to the axle in the precise axial location for optimal bearing performance.

In this description, the axial direction 48 is the direction parallel to the central axis of the axle 80. The radial direction is a direction perpendicular to the axial direction.

Figure 1A:
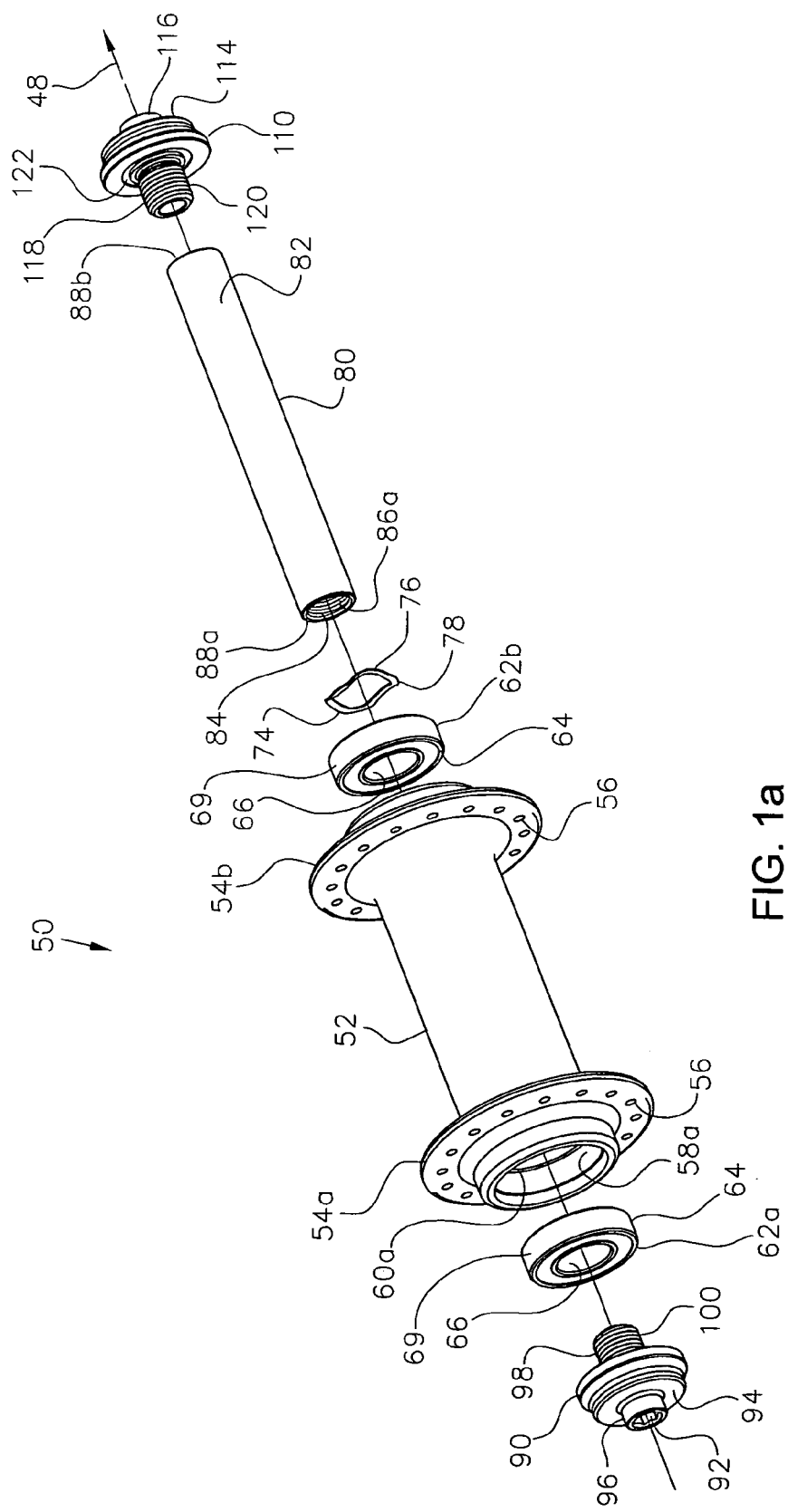
FIG. 1a is a perspective exploded view of the present invention, describing the components of a bicycle hub, including an expandable axle.
Figure 1B:
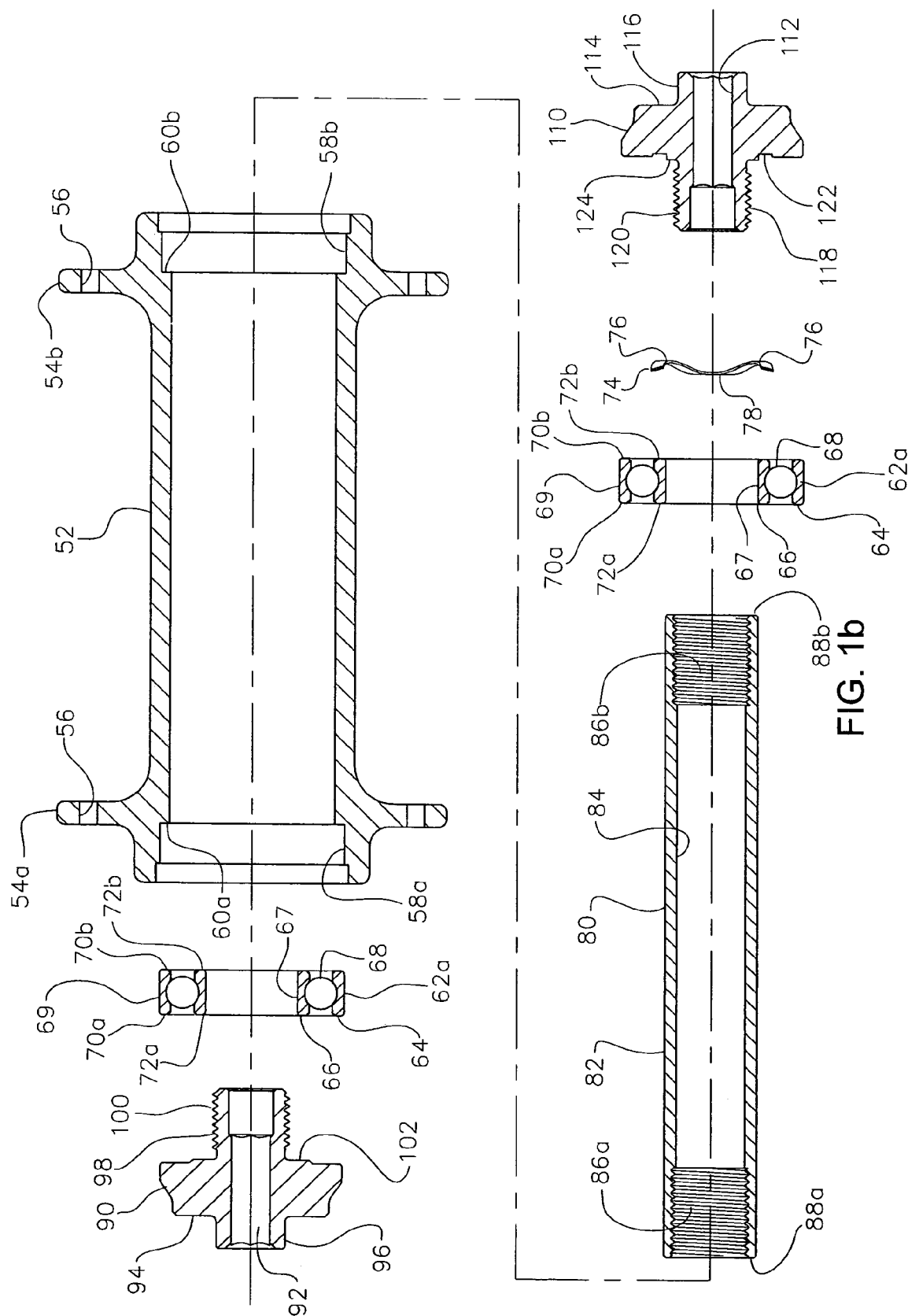

FIGS. 1a and 1b show the individual components of a bicycle hub assembly 50 of the present invention in exploded view, prior to their assembly. Bearing assemblies 62a and 62b are identical and of a conventional cartridge bearing design, including outer race 64, inner race 66 and balls 68. Outer race 64 includes faces 70a and 70b and outside diameter 69, while inner race 66 includes faces 72a and 72b and inside diameter 67. Hub shell 52 is of the conventional type and includes two axially spaced flanges 54a and 54b. Flanges 54a and 54b include axial spoke holes 56 for connection with the spokes (not shown) in the conventional manner. Hub shell 52 includes bearing bore 58a for fitment with the outside diameter 69 of bearing assembly 62a and axial shoulder 60a to serve as a depth-stop for the outer race 64 of bearing assembly 62a. Hub shell 52 includes bearing bore 58b for fitment with the outside diameter 69 of bearing assembly 62b and axial shoulder 60b to serve as a depth-stop for the outer race 64 of bearing assembly 62b.

Spring washer 74 is of the conventional type that is also termed a "wave washer" and includes a series of axially extending crests 76 that are interspaced with axially opposing troughs 78. Spring washer 74 serves as an annular spring that may be axially deflected by elastically compressing the crests 76 against the troughs 78. Axle 80 comprises a hollow cylinder with outside diameter 82, inside diameter 84, and end faces 88a and 88b. Outside diameter 82 is sized for a close clearance fit with the mating inside diameter 67 of bearing assemblies 62a and 62b. Inside diameter 84 of axle 80 includes helical internal threads 86a extending axially from end face 88a and helical internal threads 86b extending axially from end face 88b.

Fixed axle cap 90 includes collar 96 and axially-facing dropout face 94 for assembly with the dropouts (not shown) of a bicycle frame in the conventional manner. Fixed axle cap 90 also includes threaded boss 98 with helical external threads 100 and shoulder 102. External threads 100 are sized to threadably mate with internal threads 86a of axle 80. Hex bore 92 extends axially through the center of the fixed axle cap 90 and is sized to engage with a conventional hex key (not shown).

Preload axle cap 110 includes collar 116 and axially-facing dropout face 114 for assembly with the dropouts (not shown) of a bicycle frame in the conventional manner. Preload axle cap 110 also includes threaded boss 118 with helical external threads 120 and shoulder 124. External threads 120 are sized to threadably mate with internal threads 86b of axle 80. Hex bore 112 extends axially through the center of the preload axle cap 110 and is sized to engage with a conventional hex key (not shown). Annular pocket 122 is located adjacent shoulder 124 and its outside diameter and inside diameter are sized to accept the corresponding dimensions of the annular spring washer 74.

Figure 1C:
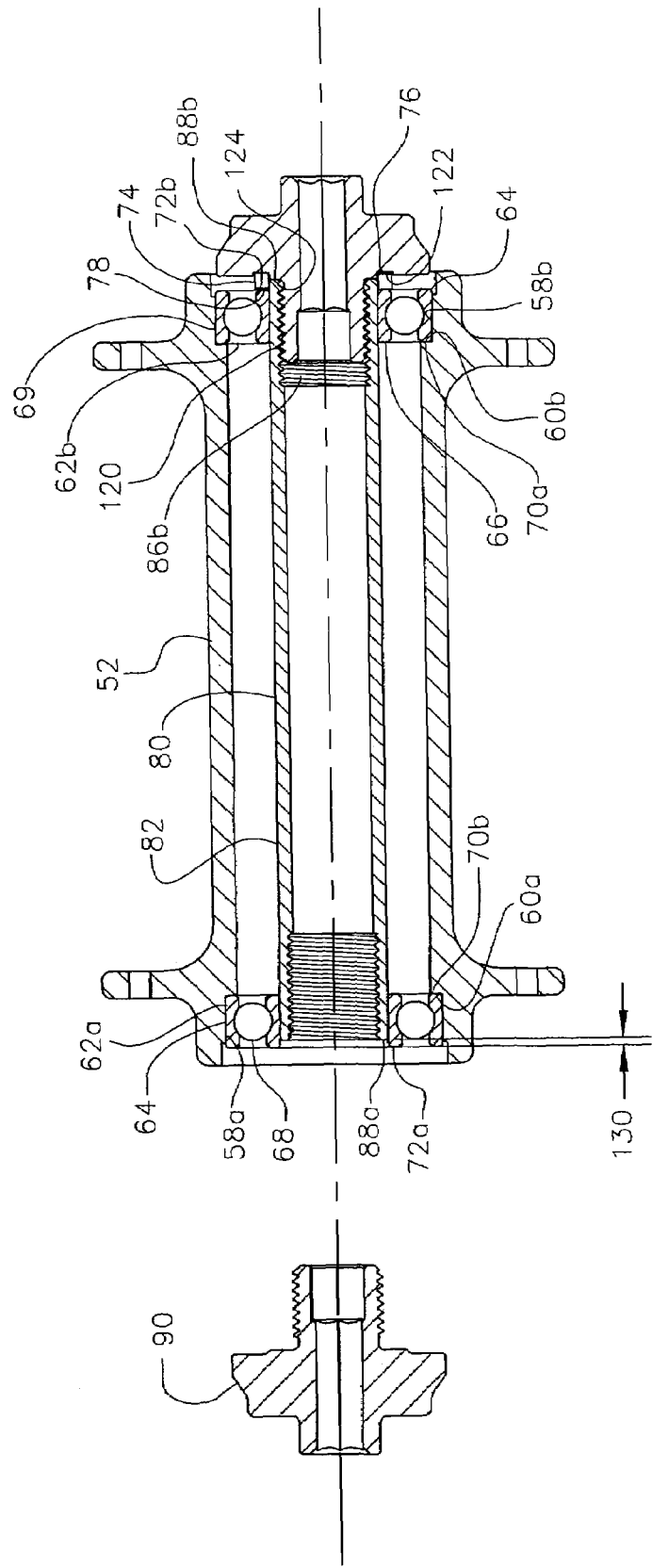

FIG. 1c shows the bearing assemblies 62a and 62b assembled to the hub shell 52, with their outside diameters 69 fitted within their respective bearing bores 58a and 58b and their outer races 64 contacting their respective shoulders 60a and 60b. Axle 80 is located inside the hub shell 52, with outside diameter 82 fitted within the inside diameter 67 of both bearing assemblies 62a and 62b. Spring washer 74 is located to surround the outside diameter 82 of axle 80. Preload axle cap 110 is threadably assembled to be lightly tightened or "finger tight" with the axle 80, with external threads 120 engaged to internal threads 86b. The spring washer 74 is shown in its free and non-compressed state, with crests 76 contacting the base of the annular pocket 122 and troughs 78 contacting the face 72b of the inner bearing race 66 of bearing assembly 62b. In this incompletely assembled state, the spring washer 74 is non-compressed and the axle 80 is located within bearing assemblies 62a and 62b such that face 88a of axle 80 is recessed by distance 130 to be below flush with face 72a of bearing assembly 62a.

Figure 1D:
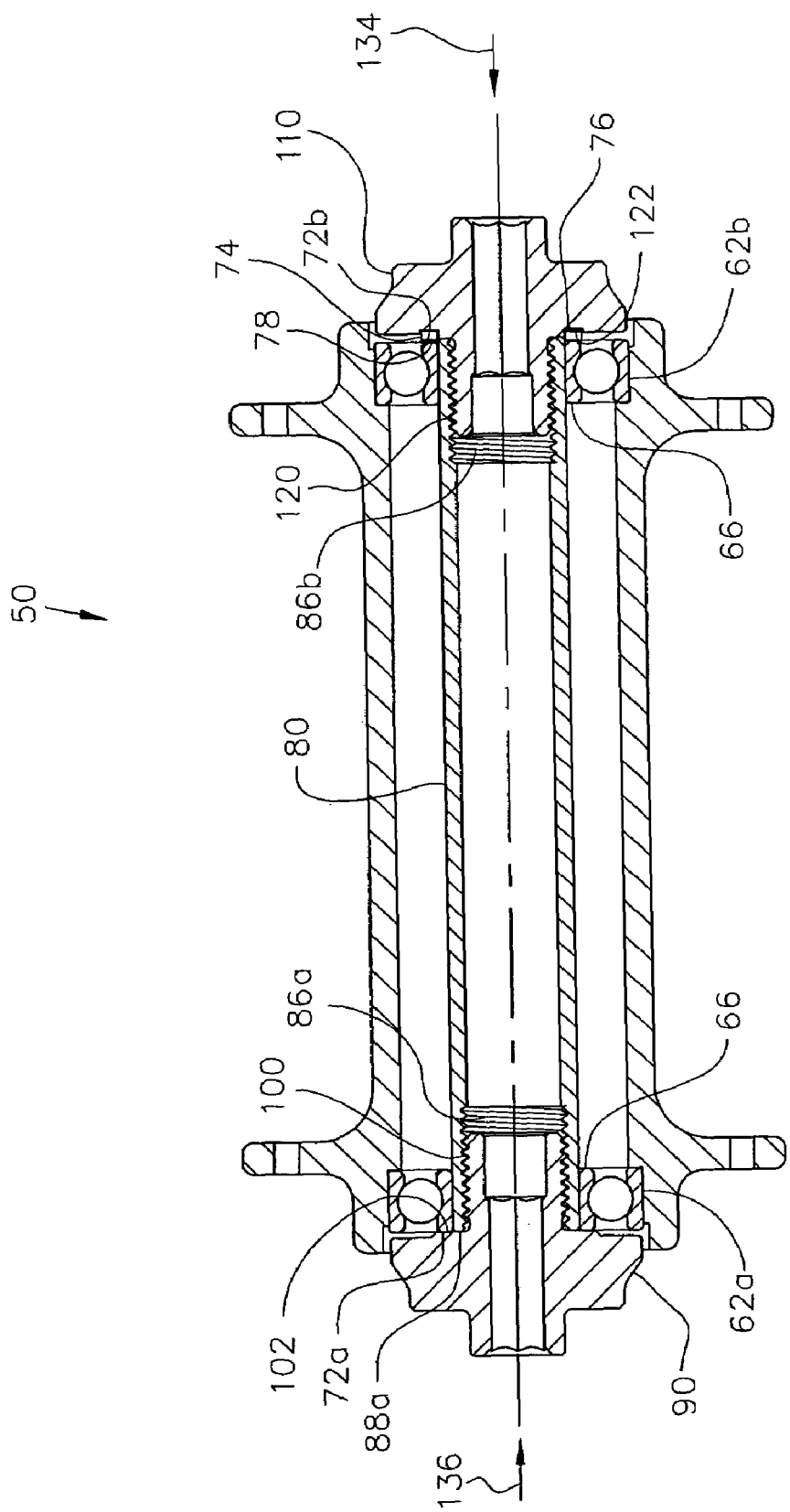
Figures 1E, 1F:
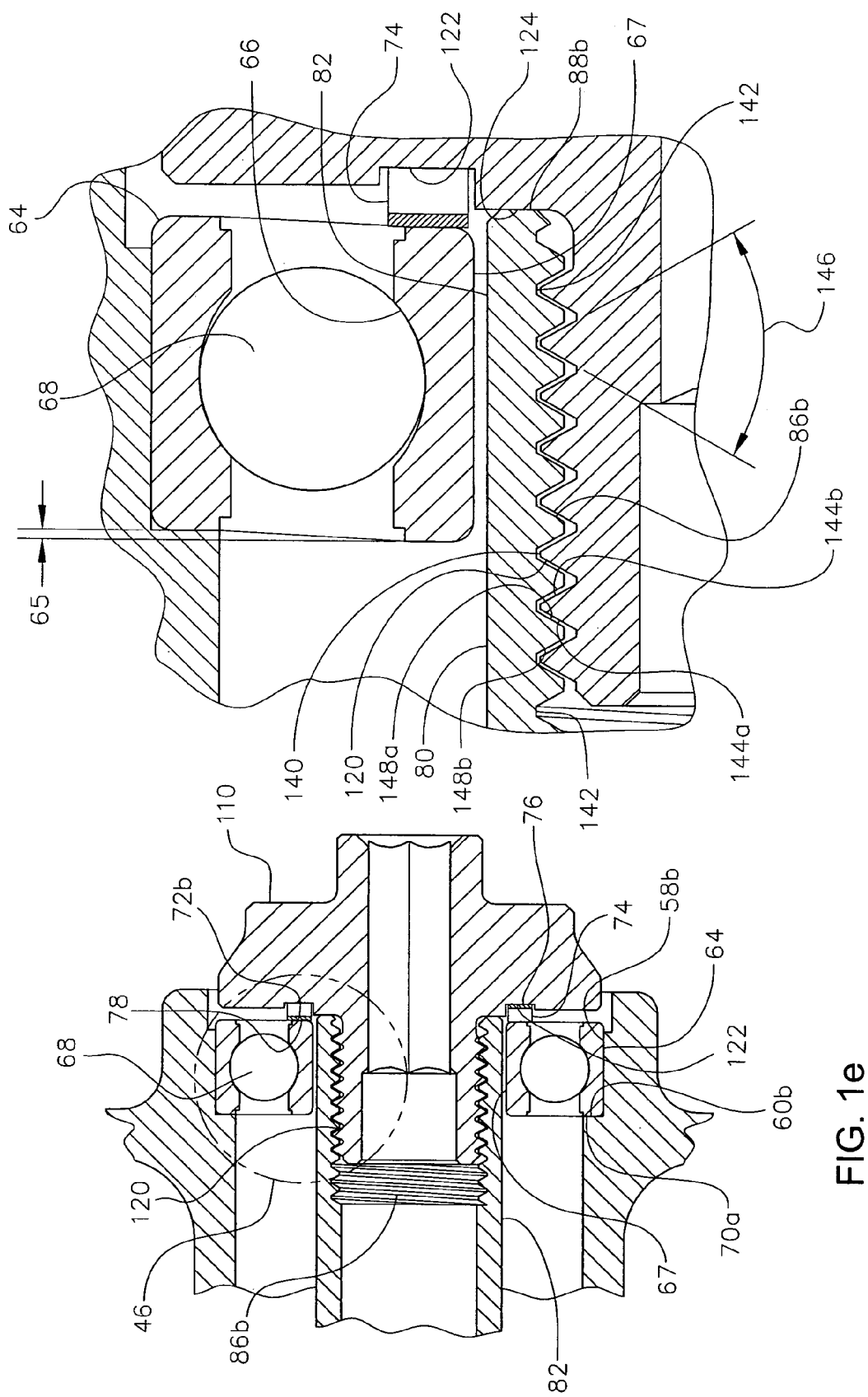
FIG. 1e is a detailed axial cross section view corresponding to FIG. 1d, showing the preload axle cap loosely assembled to the axle.
FIG. 1f is an enlarged detail axial cross section view corresponding to region 46 of FIG. 1e, detailing the threaded assembly between the preload axle cap and the axle.

FIG. 1d shows the fixed axle cap 90 threadably assembled to the axle 80, with external threads 100 lightly tightened to mating internal threads 86a. This threaded assembly serves to brace shoulder 102 against face 72a and to draw the axle 80 axially in the direction 134, thereby compressing spring washer 74 between the face 72b of bearing assembly 62b and the base of the annular pocket 122. Shoulder 102 of fixed axle cap 90 now contacts both the face 72a of bearing assembly 62a and face 88a of axle 80 so that face 72a is now axially aligned to be flush with face 88a. The compression of the spring washer 74 now serves to axially press the inner race 66 of bearing assembly 62b, biasing it axially in the direction 134 relative to outer race 64, thereby providing a controlled axial preload force to bearing assembly 62b. This axial pre-load is controlled by the characteristics of the spring washer 74 and by the depth of recess distance 130. Simultaneously, the compression of the spring washer 74 also serves to draw the axle 80 and fixed axle cap 90 in the direction 136, causing the shoulder 102 to axially press the inner race 66 of bearing assembly 62a, thereby also providing a controlled axial preload force to bearing assembly 62a. By controlling the axial dimensions of the components of this hub assembly 50, the axial preload force may be closely controlled and repeatable. As is well known in industry, for optimum bearing performance and longevity, it is desirable to axially preload the inner race 66 of a bearing with respect to its outer race 64. This preload takes up any internal clearances between the balls 68 and their races to eliminate free-play and insures the even contact of these rolling components. FIG. 1f shows how this axial pre-load force serves to axially displace the inner race 66 relative to the outer race 64 by distance 65 to take up any internal clearances within the bearing assembly. The compression of the spring washer 74 also serves to axially bias the axle 80 axially in the direction 136 and insure that the fixed axle cap 90 is in the proper axial location with respect to the bearing assembly 62a.

As described in FIGS. 1d, 1e and 1f, the fixed axle cap 90 and the preload axle cap 110 are now lightly tightened or "finger-tight" to the axle 80. The peaks 140 of external threads 120 of the preload axle cap 110 are now generally centered within the troughs 142 of the mating internal threads 86b of the axle 80 as shown in FIGS. 1e and 1f. The thread form of external threads 120 are a "V" shaped thread profile, with flank surfaces 144a and 144b inclined to provide an included flank angle 146. Similarly, internal threads 86b have a "V" shaped thread profile, with flank surfaces 148a and 148b inclined to provide parallel matched surfaces to corresponding mating flank surfaces 144b and 144a. With this lightly tightened assembly, there is no appreciable contact force between the axle 80 and either the fixed axle cap 90 or the preload axle cap 110. It is also shown that, since the fixed axle cap 90, the preload axle cap 110 and the axle 80 are all hollow components, there is a continuous central hole through the assembly shown in FIG. 1d that may be utilized to accept a conventional quick-release skewer (not shown).

Next, a first hex key (not shown) is engaged into hex bore 92 of the fixed axle cap 90 and a second hex key (not shown) is engaged into hex bore 112 of the preload axle cap 110. The hex keys are used to rotatably tighten the fixed axle cap 90 with respect to the preload axle cap 110. This causes the external threads 100 of fixed axle cap 90 to threadably tighten onto internal threads 86a of axle 80 and causes the external threads 120 of the preload axle cap 110 to threadably tighten onto internal threads 86b. These threadable engagements serve also to drive shoulder 102 into face 88a and shoulder 124 into face 88b, in turn serving to axially preload external threads 100 against internal threads 86a and to axially preload external threads 120 against internal threads 86b. Flank 144b is considered a "contacting" flank of external thread 120, since it is contacting or driving against the mating thread flank 148a of internal thread 86b when the preload axle cap 110 is threadably tightened against the axle 80. Similarly, thread flanks 144a and 148b are considered "non-contacting" thread flanks since these flanks generally do not contact each other and do not carry appreciable axial load once the assembly is threadably tightened. This interaction is detailed in FIGS. 1g and 1h where shoulder 124 of the preload axle cap 110 is pressed and braced against face 88b of axle 80 and, in reaction, contacting flank surface 144b of external threads 120 are pressed against contacting flank surface 148a of internal threads 86b. This axial preload force causes the flank surface 144b to wedge against flank surface 148a, thereby causing the outside diameter 82 of axle 80 to undergo hoop expansion, locally expanding to radially grip the inside diameter 67 of bearing assembly 62b. In an identical reaction, the external threads 100 of the fixed axle cap 90 are wedged against internal threads 86a and cause the outside diameter 82 of axle 80 to locally expand and to grip the inside diameter 67 of bearing assembly 62a. Thus, axle faces 88a and 88b serve as axial stops to brace their respective mating axle caps 90 and 110, forcing external threads 100 and 120 to draw against their respective mating internal threads 86a and 86b, thereby creating the desired expansion. It can be seen that the expansion of the axle 80 occurs in an axial expansion region 138 over an axial distance 139 that corresponds to the axial distance of the threaded engagement between internal threads 86b and corresponding external threads 120. It can also be seen that the expansion in the expansion region 138 results in full circumferential contact at the interface between the outside diameter 82 of the axle 80 and the inside diameter 67 of the inner race 66.

The inner race 66 of bearing assemblies 62a and 62b each serve as collars that are now gripped by axle 80. Bearing assemblies 62a and 62b are now locked in place on the axle 80. The precise axial bearing preload position of the bearing assembly 62b, dictated by the spring washer 74, is now also locked in place with respect to the axle 80. Thus, proper rolling contact between ball 68 and bearing races 66 and 64 is maintained. Any clearances between the outside diameter 82 of axle 80 and the inside diameter 67 of bearing assemblies 62a and 62b, such as the clearance required for assembly, are now also eliminated. Thus, there is no looseness or free-play between the axle 80 and the inner races 66 of bearing assemblies 62a and 62b. The result is a reliable, smooth-running assembly with no looseness or free-play. While the actual required expansion of the axle 80 is actually very minimal, the expansion shown in FIG. 1h is exaggerated for greater visual clarity. It should be noted that, while the hub assembly 50 utilizes two expanded connections to grip the inner races 66 of two bearing assemblies, it should be understood that the present invention may be applied to a hub assembly with only a single expanded connection.

It may be seen that the embodiment of FIGS. 1a–h constitutes an assembly of 3 coaxial elements: an internal expander element (fixed axle cap 90 and preload axle cap 110), a central expandable element (axle 80) and an outer surrounding element (inner race 66). The internal expanding element acts on the expandable element through axially restrained contact (contact between shoulder 102 and face 88a and between shoulder 124 and face 88b) and radial wedging of mating helical surfaces (contacting flanks 144b and 148a). The expanding element is expanded to adjust the fit between the its external dimension (outside diameter 82) and the internal dimension (inside diameter 67) of the outer surrounding element.

FIGS. 1a–h are shown to utilize the inclined flank of an ANSI standard V-shaped thread profile with a symmetrical 60 degree included angle between adjacent inclined thread flanks to effect expansion of the axle 80 as previously described. There is also a wide range of alternate thread profiles that include an inclined flank that may be substituted. For example, a symmetrical thread profile with greater than the 60 degree included angle between adjacent thread flanks may be substituted to provide greater mechanical advantage for increased wedging force between mating flanks, thereby providing greater radial expansion force of the axle.

Figure 2:
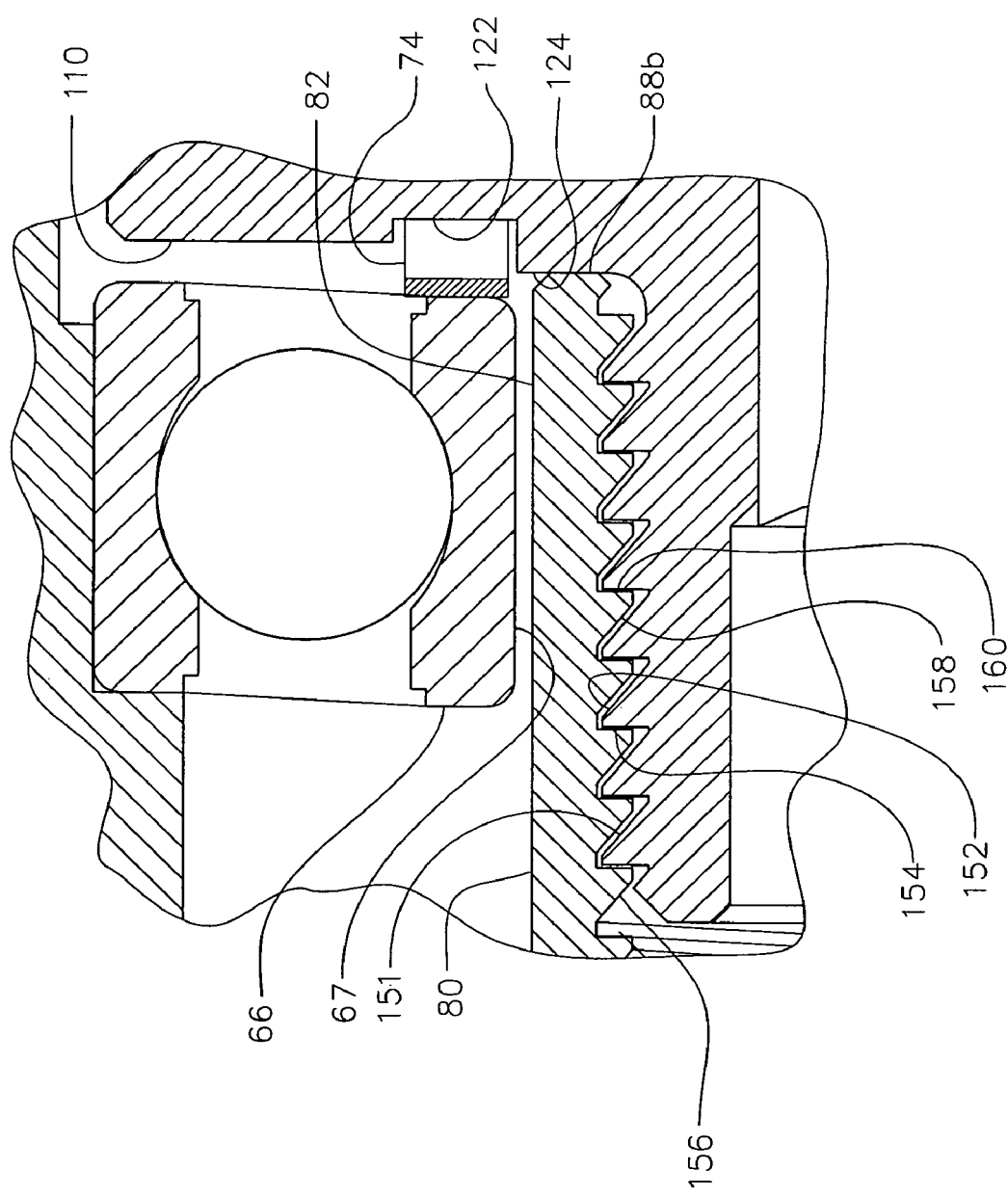
FIG. 2 is an enlarged detail axial cross section view, detailing the threaded assembly between the preload axle cap and the axle, including a sawtooth thread engagement.

Another alternative example may include a sawtooth thread profile where only the contacting flanks (corresponding to flanks 144b and 148a) of the mating threads are inclined. The non-contacting flanks may then be a steeper or a radially-extending non-inclined surface. Such an asymmetrical sawtooth thread profile is described in FIG. 2, where, instead of the 60 degree V-shaped thread profile of FIGS. 1a–h, the preload axle cap 110 includes an external sawtooth thread profile 151 where the contacting thread flank 152 is inclined and the non-contacting thread flank 154 is a radially extending non-inclined surface. Likewise, axle 80 includes a corresponding internal sawtooth thread profile 156 where the contacting thread flank 158 is inclined and the non-contacting thread flank 160 is a radially extending non-inclined surface. It may be seen that, in comparison with the ANSI 60 degree thread profile, which has an incline angle of 30 degrees (from radial) on both the contacting and non-contacting flanks, the contacting flanks of this sawtooth thread profile may have a shallower incline angle (greater than 30 degrees) for a given thread pitch. The shallower incline angle of contacting flanks serves to increase the mechanical advantage of the wedging action for greater radial expansion force on the axle 80.

Both the external threads and the mating internal threads may include matched inclined contacting thread flanks for surface-to-surface contact between operating thread flanks as previously described. Alternatively, the external threads or the internal threads can function without matched flanks for surface-to-edge contact. For example, if the internal threads of FIG. 1h were modified to employ a square or Acme thread profile, the inclined flank of the external threads would contact the corner of the square profile of the internal threads. Thus, the wedging action for expansion of the axle as previously described would still be provided, albeit with greater contact pressure between the surface of the inclined flank and the edge of the square profile.

Depending on the configuration of the various components, the contact pressures between the mating contacting thread flanks and between the shoulder and mating face may be quite high and galling or seizing of the thread flanks or mating shoulders may result. In such a case, the addition of a lubricant applied to these contacting surfaces prior to assembly may be advisable to permit these mating surfaces to slide on each other more easily and reduce the tendency for galling or seizing. Further, it may be advantageous to install a thrust washer of lower friction material between the shoulder and mating face to reduce the friction between these two surfaces and likewise reduce the amount of torque needed for expansion.

FIG. 3 describes an arrangement similar to that described in FIG. 1g, however, instead of preload axle cap 110, this embodiment employs a two-piece axle cap that consists of a threaded collar 162 and a compression nut 170. Threaded collar 162 includes through hole 166 and external threads 164 to threadably mate with the internal threads 86b of axle 80. Compression nut 170 includes annular pocket 172 to accept the spring washer 74 and flats 174 to be engaged with a mating wrench (not shown). Compression nut 170 also includes contact face 178 to contact the face 88b of the axle 80 and internal threads 176 to threadably mate with the external threads 164 of the threaded collar 162. With the threaded collar 162 and compression nut 170 assembled as shown in FIG. 3, external threads 164 of the threaded collar 162 are threadably engaged to both the internal threads 176 of the compression nut 170 and the internal threads 86b of the axle 80. The compression nut 170 is threadably tightened against the axle 80, driving contact face 178 to press against the face 88b and drawing the external threads 164 against the internal threads 86b. This creates a wedging action between external threads 164 and internal threads 86b so that the outside diameter 82 of the axle 80 becomes expanded in the manner similar to that described in FIGS. 1g–h.

FIG. 4 describes an arrangement similar to that described in FIG. 1g, however, instead of the expansion-inducing thread engagement being located adjacent the end of the axle, this engagement is located an axial distance from the end of the axle and results in a localized bulged expansion. Axle 180 comprises a hollow cylinder with outside diameter 182, inside diameter 184, and end face 188b. Outside diameter 182 is sized for a close clearance fit with the mating inside diameter 67 of bearing assembly 62b. Inside diameter 184 of axle 180 includes helical internal threads 186b extending axially from end face 188b. Axle cap 190 includes collar 196, shoulder 202, central hole 197, and axially-facing dropout face 194 for assembly with the dropouts (not shown) of a bicycle frame in the conventional manner and flats 192 to be engaged with a mating wrench (not shown). Axle cap 190 also includes threaded boss 198 with helical external threads 200 and relieved portion 199 of reduced outside diameter that extends between external threads 200 and shoulder 202 and is sized to provide clearance with internal threads 186b. External threads 200 are sized to threadably mate with internal threads 186b of axle 180. Axle cap 190 also includes axially extending bore 191 that is adjacent the shoulder 202 and is sized to overhang and closely surround the outside diameter 182 of the axle 180 in the region adjacent the end face 188b.

In comparison with FIG. 1g, it is shown in FIG. 4 that axle 180 extends axially outboard of bearing 62b by distance 195.

In this assembly the axial length of the relieved portion 199 is adjusted to locate the external threads 200 to be adjacent the bearing assembly 62b, which is the desired region of expansion. When the axle cap 190 is threadably tightened against the axle 180, shoulder 202 bears against face 188b and external threads 200 are wedged against internal threads 186b to induce expansion of the outside diameter 182 of the axle 180 in the manner previously described. This expansion occurs in an expansion region 183, located in the vicinity of external threads 200 and constitutes a bulged expansion, where the axle 180 remains unexpanded in the portions located axially on either side of this expansion region 183.

Since the required contact force between the face 188b and the shoulder 202 may be quite high to effect expansion of the axle 180, the axle 180 may have a tendency to become flared, expanded or otherwise distorted in the end region of face 188b. This flared expansion may result in permanent deformation of the axle 180 and may detract from the intended expansion in the expansion region 183. Bore 191 of the axle cap 190 is sized and located to create a barrier that will constrain this flared expansion. An alternate method to control this flared expansion would include forming an end flange into the end of the axle. The additional wall thickness due to this flange would add hoop strength and stiffness to the axle end region. Such a flange could also be utilized to create a larger surface area of contact with the shoulder 202, thereby reducing the contact pressure between the two.

Figure 5:
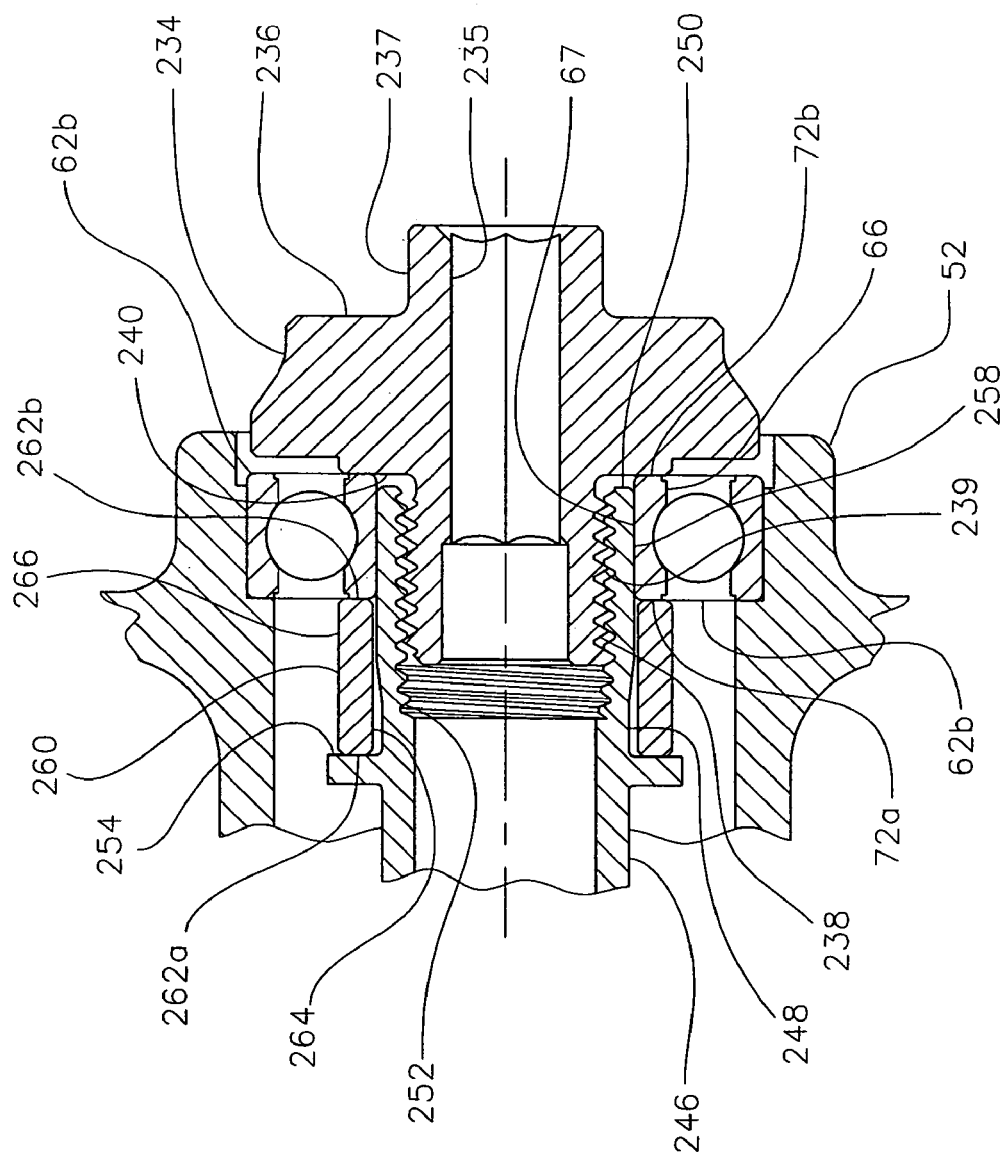
FIG. 5 is an enlarged detail axial cross section view, detailing the threaded assembly between the axle cap and the axle, including two-part axle cap.

FIG. 5 describes an embodiment where the face of the axle cap may bear directly against the inner race of the bearing 62b to serve as an axial stop to create the expansion of the axle. Axle cap 234 is of a similar configuration to fixed axle cap 90, including hex bore 235, face 236, collar 237, threaded boss 238, external threads 239, and shoulder 240. Axle 246 includes outside diameter 248, end face 250 and internal threads 252 that threadably mate with external threads 239. Axle 246 also includes a shoulder 254 that is located in a region axially inboard from the expansion region 258. Spacer 260 is of a hollow cylindrical geometry, with end faces 262a and 262b, inside diameter 264 and outside diameter 266.

These components are assembled as shown in FIG. 5. Unlike the embodiment of FIGS. 1a–h, end face 250 of axle 246 is axially spaced from shoulder 240 so that the two do not contact each other. Instead, shoulder 240 bears against face 72b of inner race 66 and face 72a bears against end face 262b of spacer 260 and end face 262a bears against the shoulder 254 of axle 246. Thus, it may be seen that the requisite axial stop is achieved through the axial stack-up of the shoulder 254 through the spacer 260 and through the inner race 66 and to the shoulder 240. With shoulder 240 axially blocked relative to the axle 246, threadably tightening the axle cap 234 relative to the axle will serve to wedge the internal threads 252 against the external threads 239 to create expansion of the axle 246 in the expansion region 258 in a manner previously described.

The axle, as shown in the previous figures, may have a relatively constant and unbroken cross-sectional wall thickness in the axial region of the threaded engagement between inclined thread flanks. Depending on the stiffness of the axle material, the hoop stiffness of this configuration will have a generally high resistance to the circumferential stretching involved to create the hoop expansion. This hoop stiffness must be overcome during expansion of the expansion region and therefore creates a resistance to the expansion. It may be desirable, in some designs, to reduce this hoop stiffness and thereby promote the hoop expansion in the expansion region. To achieve this, the wall thickness of the axle may be designed to be non-constant or otherwise locally relieved in the engagement region to reduce hoop stiffness of the axle and thereby promote its radial expansion. For example, the axle may include an axial split or slot that is cut through its wall and extends axially along the expansion region of the threaded engagement between inclined thread flanks. The engagement region of the axle may now flex more easily in the radial direction and will have less resistance to radial expansion. Another alternate axle design may include a thinned region, where the cross-sectional wall thickness of the axle in the engagement region is locally thinned to provide a site where the axle will stretch more easily to reduce its hoop stiffness. This thinned region may reduce the hoop stiffness of the axle and provide reduced resistance to the expansion of its outside diameter created by the wedging action of the inclined thread flank.

Figure 6B:
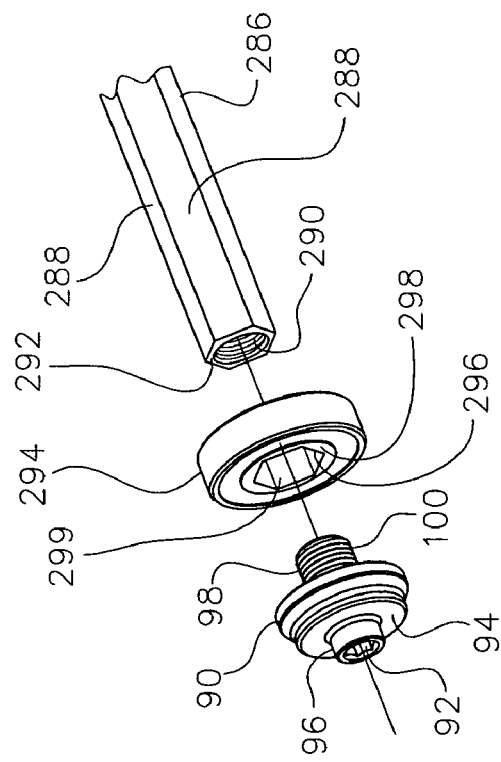
FIG. 6b is a perspective exploded view, showing the axle, bearing assembly and axle cap, including an axle with non-circular cross section mated to a bearing with corresponding internal geometry.
Figure 6A:
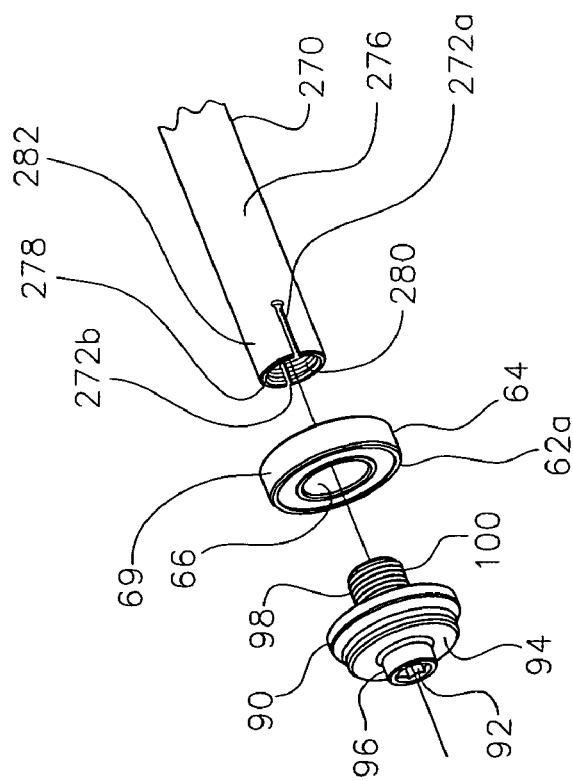
FIG. 6a is a perspective exploded view, showing the axle, bearing assembly and axle cap, including an axial slit in the axle to facilitate expansion.

As an example, the embodiment of FIG. 6a shows an arrangement where the axle 270 of FIG. 6a includes slots 272a and 272b that extend axially from face 278. Axle 270 also includes internal threads 280 to threadably mate with external threads 100 of the fixed axle cap 90. Fixed axle cap 90 and bearing assembly 62b are assembled to axle 270 in a manner similar to that described in FIGS. 1a–h.

Slots 272a and 272b now allow the axle 270 to flex radially outwardly in the expansion region 282 with reduced resistance to radial expansion. Further, since expansion of the expansion region 282 of the axle 270 is therefore more easily achieved, the axial contact force between the face 278 and the mating shoulder 102 and between the mating contacting thread flanks of external threads 100 and internal threads 280 is reduced. The slots 272a and 272b also permit a greater range of expansion in the expansion region 282. These slots 272a and 272b are merely representative methods of weakening the axle 270 to reduce hoop stiffness in the expansion region 282. A wide range of weakening methods may alternatively be employed, including creating a thinned region or a perforated region instead of a slot. A thinned region will have a reduced cross sectional area to reduce the hoop stiffness adjacent the thinned region.

The previous embodiments have utilized a cylindrical axle shaft with a circular outer cross section profile. However, the present invention may be easily adapted to an axle or shaft with a non-circular outer cross section profile. FIG. 6b describes a representative embodiment that utilizes such an axle of non-circular outer cross section. Axle 286 has a hexagonal external cross section profile with six longitudinally extending flats 288. Axle 286 also includes internal threads 290 and end face 292. Bearing assembly 294 includes hexagonal bore 296 through its inner race 298 that is sized for close clearance with the mating flats 288 of the axle 286. Fixed axle cap 90 is identical to that shown in FIGS. 1a–h.

In FIG. 6b, the axle 286 is substituted for axle 80 and the bearing assembly 294 is substituted for bearing assembly 62a in the assembly described in FIGS. 1a–h. It may be seen that, due to their non-circular mating profiles, the axle 286 is now rotatably keyed to the inner race 298 of bearing assembly 294. The polygon profile is one exemplary non-circular keyed engagement profile, other noncircular profiles may be substituted as well, including keyways, flats and splines. It may also be noted that the hexagonal profile of the axle 286 shown here provides a thinned region of reduced wall thickness at a point midway across its flats 288. The outer edges of flats 288 create a peaked profile with a comparatively thicker wall thickness. This thinned region may be utilized to locally reduce hoop stiffness of the axle and thereby promote its hoop expansion as previously described.

While the preceding description describes an expanding axle assembly as utilized in a bicycle hub, it should be understood that this unique arrangement may be applied to a wide range of applications throughout industry where it is desirable to expand an outer dimension of a shaft.

With reference to the embodiment of FIGS. 1a–f, the inner race 6 of the bearing assembly 62 may be considered as a cylindrical sleeve with a central bore and the axle 80 may be considered as a shaft with an external dimension. The fixed axle cap 90 may alternatively be a conventional headed bolt. With these substitutions, the cylindrical sleeve is assembled over the shaft and the shaft is expanded by the headed bolt in the region of the sleeve and in the manner similar to that described in FIGS. 1a–f. This expansion serves to adjust the clearance and the fit between the external dimension of the shaft and the central bore of the sleeve. Furthermore, the sleeve may not necessarily be cylindrical at all and may alternatively include any manner of external dimension. Even further, the sleeve may simply be a bored hole in a continuous flat plate, extending perpendicular to its surface.

Figure 7:
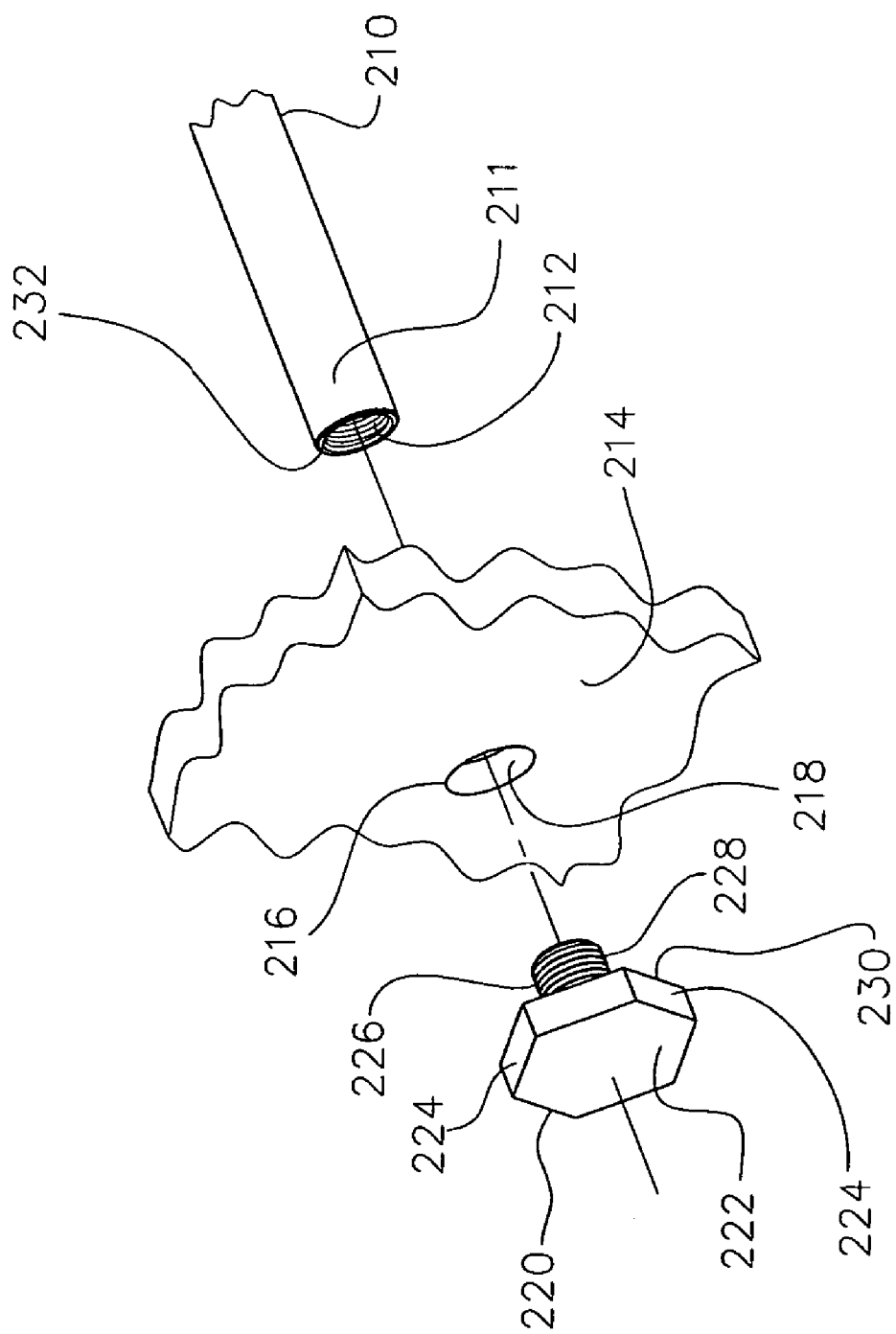
FIG. 7 is a perspective exploded view of the present invention, describing the components of an expandable axle assembly, including a flat plate.

Thus, it may be seen in the embodiment of FIG. 7, shaft 210 includes axially extending internal threads 212 and an external dimension 211. Plate 214 includes a hole 216 with an inside diameter 218 that corresponds to external dimension 211 and extends axially through the plate 214. Bolt 220 is of the conventional type and includes head 222 with flats 224 and also includes shank 226 with external threads 228. Bolt 220 also includes under-head shoulder 230 adjacent shank 226. The components of FIG. 7 may be assembled such that shaft 210 is fitted into hole 216 such that inside diameter 218 surrounds the threaded engagement between internal threads 212 and external threads 228. External threads 228 of bolt 220 are threaded into the internal threads 212 of the shaft until the under-head shoulder 230 of the bolt 220 contacts the end face 232 of the shaft. A wrench (not shown) may be fitted to flats 224 to further tighten the bolt 220 relative to the shaft 210 to cause the outside diameter 211 to increase and expand to grip the inside diameter 218 of the hole 216 in the manner previously described.

While my above description contains many specificities, these should not be construed as limitations on the scope of the invention, but rather as exemplifications of embodiments thereof. For example:

While the preceding description describes a shaft that is expanded to contact and grip the mating bore, the present invention may alternatively be employed to closely control the clearance fit between a shaft and its mating bore. By expanding the shaft in the manner previously described, the clearance between the outside of the shaft and its mating bore is reduced. Thus, the shaft may be expanded to adjust a clearance fit with its mating bore. Additionally, in the case of a press fit between an unexpanded shaft and its mating bore, expansion of the shaft in the manner previously described may be utilized to augment the press fit.

Further, while the outside surface of the axle and the inside diameter of the bearing's inner race are shown to be smooth mating surfaces in the expansion region, it is also envisioned that one or both of these surfaces may be a configured or non-smooth surface. For example, the outer surface of the axle may include external threads that are mated to corresponding internal threads that are formed in the inside diameter of the inner bearing race. Threadable adjustment of this assembly would permit the inner race to be axially adjusted relative to the axle. Expansion of the axle could then be utilized to lock the threaded assembly and fix the adjustment. Alternatively, one or both of these surfaces may be knurled or roughened to augment the grip between the axle and the inner race. Such a roughened surface would be especially beneficial if the mating surface were made of a softer material.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications that are within its spirit and scope as defined by the claims.

What is claimed is:

1. An expandable shaft assembly, comprising:
an axially extending shaft, including an axial axis, an external dimension, at least one shaft end, and a bore extending generally axially from said at least one shaft end;
a second element, including an axially extending, externally threaded portion with a first thread flank, a shoulder portion extending in a generally radially outwardly direction;
a radially extending end face that is axially constrained relative to said shaft wherein said radially extending end face is one of (1) integral with said shaft, and (2) on a separate element;
wherein said bore of said axially extending shaft includes an axially extending, internally threaded portion with a second thread flank, at least one of said first thread flank and said second thread flank is an inclined thread flank, said externally threaded portion of said second element is threadably engaged with said internally threaded portion of said shaft such that said first thread flank contacts said second thread flank, and said shoulder portion of said second element is pressed against said end face and said inclined thread flank is wedged against the other of said first thread flank and said second thread flank to provide radial expansion of said external dimension in an expansion region.

2. An expandable shaft assembly according to claim 1, wherein said end face is integral with said shaft.

3. An expandable shaft assembly according to claim 1, wherein said second element is an axle cap.

4. An expandable shaft assembly according to claim 1, wherein said shoulder portion is integral with said second element.

5. An expandable shaft assembly according to claim 1, including a collar element with an internal bore, wherein at least a portion of said shaft is located in said internal bore and said expansion provides a reduced clearance between said external dimension and said internal bore of said collar element.

6. An expandable shaft assembly according to claim 5, wherein said internal bore of said collar element surrounds and encloses said shaft in said expansion region.

7. An expandable shaft assembly according to claim 5, wherein said expansion provides contact between said external dimension and said internal bore of said collar element.

8. An expandable shaft assembly according to claim 7, wherein said contact includes circumferential contact to surround said shaft.

9. An expandable shaft assembly according to claim 7, wherein said contact includes gripping contact between said external dimension and said internal bore of said collar element.

10. An expandable shaft assembly according to claim 5, wherein said collar element is the inner race of a bearing assembly.

11. An expandable shaft assembly according to claim 10, wherein said inner race is the inner race of a cartridge bearing assembly.

12. An expandable shaft assembly according to claim 5, wherein said shaft includes external geometry in said expansion region and wherein said internal bore of said collar includes geometry that is matched to said external geometry.

13. An expandable shaft assembly according to claim 12, wherein said internal bore of said collar is rotatably keyed to said external geometry.

14. An expandable shaft assembly according to claim 5, including a means to axially bias said collar element relative to said shaft.

15. An expandable shaft assembly according to claim 14, wherein said means to axially bias includes a spring.

16. An expandable shaft assembly according to claim 14, wherein said collar is an inner race of a bearing assembly and wherein said means to bias constitutes a means to axially preload said bearing assembly.

17. An expandable shaft assembly according to claim 5, wherein said shaft includes two axially opposed ends, including a first shaft end and a second shaft end, with a first expandable shaft assembly and a first collar element associated with said first shaft end, and a second expandable shaft assembly and a second collar element associated with said second shaft end.

18. An expandable shaft assembly according to claim 5, wherein said collar is axially constrained relative to said shaft.

19. An expandable shaft assembly according to claim 5, wherein said collar includes said end face.

20. An expandable shaft assembly according to claim 5, wherein said collar includes a collar end, and wherein said shoulder of said second element contacts both said shaft end and said collar end.

21. An expandable shaft assembly according to claim 1, wherein said shaft includes a thinned region of reduced cross-sectional wall thickness in said expansion region.

22. An expandable shaft assembly according to claim 1, wherein said shaft includes a relieved wall portion in said expansion region.

23. An expandable shaft assembly according to claim 22, wherein said relieved wall portion is an open wall portion.

24. An expandable shaft assembly according to claim 1, wherein said second element includes a central bore extending axially through the second element.

25. An expandable shaft assembly according to claim 1, wherein said shaft includes a central bore extending axially through the shaft.

26. An expandable shaft assembly according to claim 1, wherein said first and second thread flanks are inclined thread flanks, and wherein said first inclined thread flank has matched surface-to-surface contact with said second inclined thread flank.

27. An expandable shaft assembly according to claim 1, wherein the thread profile of at least one of said internally threaded portion and said externally threaded portion constitutes a symmetrical V shaped thread profile.

28. An expandable shaft assembly according to claim 1, wherein the thread profile of at least one of said internally threaded portion and said externally threaded portion constitutes a sawtooth thread form.

29. An expandable shaft assembly according to claim 1, wherein said shoulder portion constitutes a continuous, circumferential, radially extending surface for circumferential contact between said shoulder and said radially extending end face.

30. An expandable shaft assembly according to claim 1, wherein said shaft is a vehicle wheel axle.

31. An expandable shaft assembly according to claim 1, wherein said second element is a multi-part element, including a first part and a second part, wherein said first part includes said externally threaded portion and said second part includes said shoulder portion.

32. An expandable shaft assembly according to claim 31, wherein said first part is threadably engaged to said second part by means of an axially extending threaded engagement, and wherein the threadable adjustment of the first part relative to the second part serves to axially displace said first part relative to said shaft to provide said radial expansion.

33. An expandable shaft assembly according to claim 1, wherein said expansion region is axially spaced from said shaft end and wherein said shaft end remains unexpanded.

34. An expandable shaft assembly according to claim 1, wherein said second element includes geometry adjacent said shoulder portion to limit radial deformation of said shaft end.

35. An expandable shaft assembly according to claim 34, wherein said geometry adjacent said shoulder portion includes an axially extending surface to overhang said shaft end and to constrain the radial expansion of said shaft end.

36. An expandable shaft assembly according to claim 1, wherein said shaft includes circular cylindrical external geometry in said expansion region.

37. An expandable shaft assembly according to claim 1, wherein said shaft includes noncircular cylindrical external geometry in said expansion region.

38. An expandable shaft assembly according to claim 1, including lubricant between at least one of (1) said first thread flank and said second thread flank and (2) said shoulder portion and said end face.

39. An expandable shaft assembly according to claim 1, including a thrust washer between said shoulder portion and said end face.

40. An expandable shaft assembly according to claim 1, wherein said second element includes noncircular geometry to engage with a mating wrench to facilitate manual manipulation of said second element.

41. An expandable shaft assembly according to claim 1, wherein said second element includes at least one second element end and a bore extending generally axially from said at least one second element end.

* * * * *